No. 767,542. PATENTED AUG. 16, 1904.
A. J. CARLEY.
VEHICLE WHEEL.
APPLICATION FILED JAN. 7, 1904.
NO MODEL.

Witnesses

By

Inventor
Allen J. Carley

Attorney

No. 767,542.                                              Patented August 16, 1904.

UNITED STATES PATENT OFFICE.

ALLEN J. CARLEY, OF ZWOLLE, LOUISIANA, ASSIGNOR OF ONE-HALF TO GEORGE LEONE, OF ZWOLLE, LOUISIANA.

VEHICLE-WHEEL.

SPECIFICATION forming part of Letters Patent No. 767,542, dated August 16, 1904.

Application filed January 7, 1904. Serial No. 188,095. (No model.)

*To all whom it may concern:*

Be it known that I, ALLEN J. CARLEY, a citizen of the United States, residing at Zwolle, in the parish of Sabine and State of Louisiana, have invented certain new and useful Improvements in Vehicle-Wheels; and I do declare the following to be a full, clear, and exact description of the invention, such as will enable others skilled in the art to which it appertains to make and use the same.

This invention relates to improvements in the construction of wheels for vehicles; and it consists of certain novel features of construction, combination, and arrangement of parts, as will be more fully described, and particularly pointed out in the appended claim.

Figure 1:
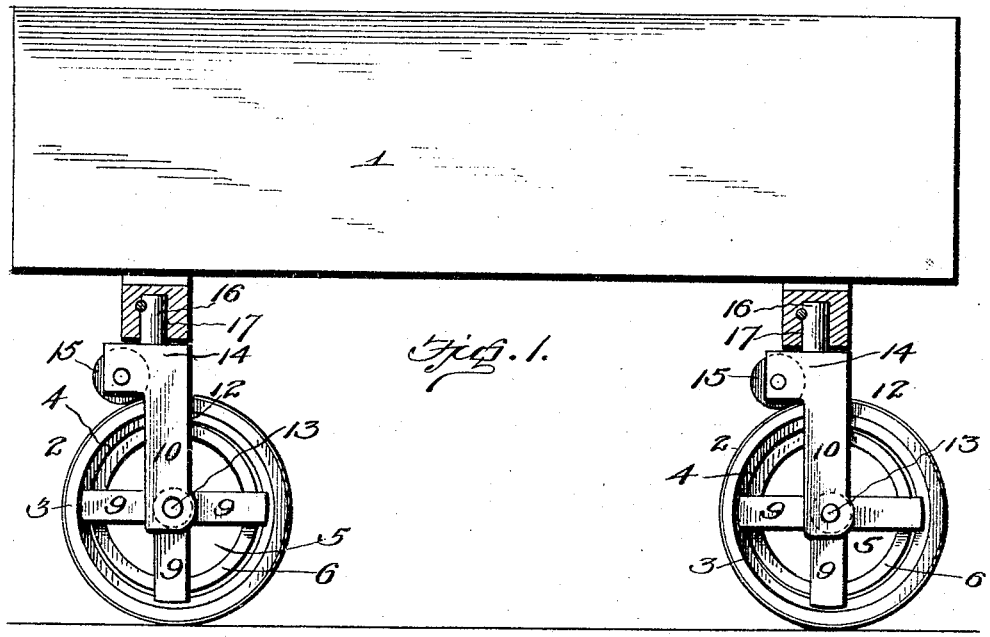
Figures 2, 3, 4:
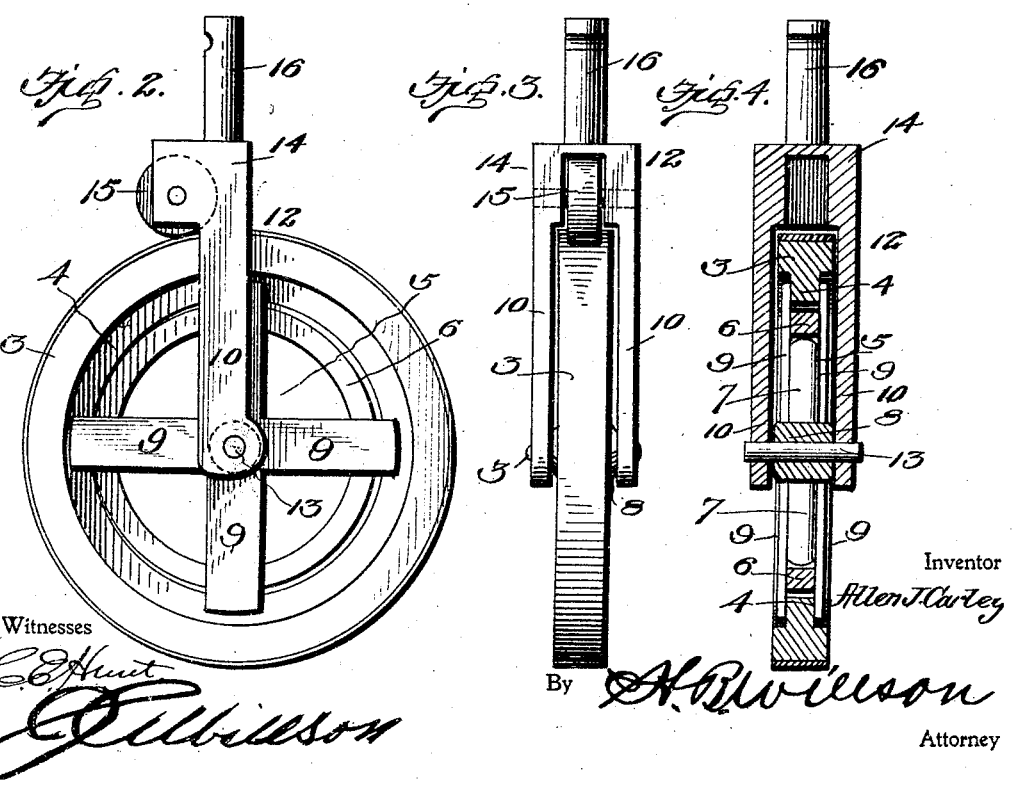

In the accompanying drawings, Figure 1 is a side elevation of a wagon-body mounted upon wheels constructed in accordance with the invention. Fig. 2 is an enlarged side view of one of the wheels and its support removed from the wagon-body. Fig. 3 is an edge view of the same, and Fig. 4 is a central vertical longitudinal sectional view.

Referring more particularly to the drawings, 1 denotes the body of the wagon.

2 denotes the improved wheel, which consists of an outer rim or tread member 3, having an interior annular flange 4. Within the space formed by the annular flange 4 is arranged a wheel 5, which is of slightly less diameter than said space and which has a rim 6 of substantially the same thickness as the flange 4. The wheel 5 is provided with radial spokes 7, which are here shown as four in number and are connected to a centrally-arranged hub 8. To each side of the spokes 7 are secured radially-disposed arms or bars 9, which project beyond the edge of the rim 6 and engage the flange 4, thereby holding the wheel 5 in place within the space formed by said flange.

The rim or tread member 3 and the wheel 5 are arranged between the arms 10 of a forked support 12, in the lower ends of which is arranged a short axle 13, on which is journaled the wheel 5. The upper end or head 14 of the forked support is formed with an offset or bearing bracket, in which is journaled a wheel or roller 15. This roller is adapted to bear on the edge of the rim or tread member 3 and supports the body of the vehicle. The arms of the forked support are of such length that the lower edge of the wheel 5 does not engage the lower portion of the flange 4, so that the entire weight of the load is supported by the outer rim or tread member 3, through the roller 15, which being mounted in the offset bracket will engage the rim 3 in advance of the center of the same, thereby drawing the weight of the load forward of the center of gravity, so as to reduce the resistance to forward traction of the vehicle. This action is further facilitated by the engagement of the forward edge of the inner wheel 5 with the forward side of the annular flange 4 on the inner edge of the rim as the vehicle is moved along.

The forked supports may be attached to the vehicle-body in any suitable manner, but are here shown as provided with an upwardly-projecting stem 16, which is adapted to engage a socket or recess 17 in the bolsters of the vehicle.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A vehicle-wheel comprising an outer rim or tread member, an interior annular flange formed on said rim, a head having a forked support arranged over said rim, a wheel journaled in the lower ends of said fork to engage the forward edge of the said flange, retaining arms or bars secured to said wheel to engage said flange and hold said wheel in place, an offset bearing-bracket formed on the forward side of said head, a roller journaled in said bracket to engage the tread of said rim at a point in advance of the same and axis of the wheel, and means for attaching said head to the vehicle, substantially as described.

In testimony whereof I have hereunto set my hand in presence of two subscribing witnesses.

ALLEN J. CARLEY.

Witnesses:
J. W. GAHLEN,
WM. TYLER.